(12) United States Patent
Kim et al.

(10) Patent No.: US 8,616,755 B2
(45) Date of Patent: Dec. 31, 2013

(54) LIGHT GUIDE PLATE FOR SURFACE LIGHT SOURCE DEVICE AND BACKLIGHT UNIT USING THE SAME

(75) Inventors: Sang Pil Kim, Gyeongsangbuk-do (KR); Chang Ik Hwang, Daegu (KR); Hee Cheong Lee, Gyeonggi-do (KR); Sang Hoon Lee, Gyeongsangbuk-do (KR); Jun Sang Park, Gyeongsangbuk-do (KR); Kwang Soo Kim, Daejeon (KR)

(73) Assignee: Toray Advanced Materials Korea Inc. (KR)

( * ) Notice: Subject to any disclaimer, the term of this patent is extended or adjusted under 35 U.S.C. 154(b) by 181 days.

(21) Appl. No.: 13/233,834

(22) Filed: Sep. 15, 2011

(65) Prior Publication Data
US 2012/0134177 A1    May 31, 2012

(30) Foreign Application Priority Data
Nov. 29, 2010    (KR) .......................... 10-2010-119312

(51) Int. Cl.
*F21V 7/04* (2006.01)
(52) U.S. Cl.
USPC ................................ 362/626; 349/63; 349/65

(58) Field of Classification Search
USPC .............................. 362/623–626; 349/61–66
See application file for complete search history.

(56) References Cited

FOREIGN PATENT DOCUMENTS

| JP | 6118247 | 4/1994 |
|---|---|---|
| KR | 580890 | 6/2004 |

*Primary Examiner* — Jason Moon Han
(74) *Attorney, Agent, or Firm* — Levenfeld Pearlstein, LLC

(57) ABSTRACT

A light guide plate for a surface light source device is provided, which includes an incident surface configured to have light from lamps disposed along a predetermined axis, be incident thereon, an emitting surface configured to have the incident light emitted therefrom, a back surface configured to face the emitting surface, and a plurality of unit cells configured to have microprism patterns engraved thereon and distributed and arranged on the back surface. A crossing angle of a microprism arrangement axis, formed by a ridge direction of the microprism patterns, and of an arrangement axis of the lamps is disposed in an alternate angle. The light guide plate has a high front brightness and an excellent uniformity in brightness and does not have a moire phenomenon. In a backlight unit, the use of optical sheets stacked on the light guide plate can be reduced.

14 Claims, 6 Drawing Sheets

LIGHT GUIDE PLATE FOR SURFACE LIGHT SOURCE DEVICE AND BACKLIGHT UNIT USING THE SAME

CROSS-REFERENCE TO RELATED APPLICATION

Priority to Korean patent application number 10-2010-119312 filed on Nov. 29, 2010, the entire disclosure of which is incorporated by reference herein, is claimed.

BACKGROUND OF THE INVENTION

1. Field of the Invention

The present invention relates to a light guide plate for a surface light source device and a backlight unit using the same and, more particularly, to a light guide plate for a surface light source device and a backlight unit using the same, wherein a plurality of unit cells having microprism patterns engraved thereon is distributed and arranged on the back surface and a crossing angle between a microprism arrangement axis formed by a ridge direction of the microprism patterns on the unit cells and a lamp arrangement axis formed by the lamps, is disposed in an alternate angle.

2. Background of the Related Art

A light guide plate is chiefly applied to liquid crystal display devices and has been used as means for supplying light to a Liquid Crystal Display (LCD) module which is a passive element. That is, the light guide plate guides light emitted from light sources (e.g., LED lamps) disposed laterally to or under the light guide plate, diffuses the emitted light, and supplies the light to LCD modules stacked on the light emitting surface.

Furthermore, a backlight unit is formed by stacking a light diffusing sheet, a prism sheet, etc. on the side of a surface of the light guide plate from which light is emitted, thereby controlling the brightness and the viewing angle of the light.

Efforts have recently been made to reduce the number of parts by intergrating light guide plate and its peripheral parts to simplify the structure or reduce the prime cost.

For example, Patent Document 1 discloses a light guide plate in which a light scattering unit having a fine concave and convex portion is formed at the bottom of or any one of the surfaces of the light guide plate and to which a reflection plate for controlling the light scattering, such as transparent ink, is attached. According to this construction, a light guide plate having good sacttering efficiency and brightness can be fabricated simply and quickly. In this proposal, however, only brightness improvement by the light scattering unit and the reflection plate, not uniformity of brightness has been described. Furthermore, a manufacturing method of light guide plate by pattern shape molding of a depressed engraving on the back surface of the light guide plate is utilized in this proposal. The light guide plate manufactured by this method has slightly higher brightness than a light guide plate using a printing method. But, the problem is still continuing that brightness is degraded and the cost of a backlight unit is increased to the extent that a large quantity of optical sheets are required.

To solve the problems, the development of technology for significantly improving brightness by molding patterns, such as triangle structures, on the back of a light guide plate and controlling an optical path has been attempted. For example, Patent Document 2 discloses a light guide plate having a triangular reflection unit provided on the back of a light-emitting surface. This technology, however, is characterized in that brightness is excellent, but it has an irregular optical distribution in which the uniformity of brightness is insufficient because the triangular back reflection surface reflects light only in a limited and specific direction. This technology is also problematic in that a moire phenomenon due to a combination of prism shapes is generated when the prism is used as optical sheets on the top of the emitting surface.

Furthermore, since the LED lamps are used as light sources, a problem, such as brightness uniformity due to the formation of a dark portion between the LED lamps and lamps, and a problem, such as the generation of a moire phenomenon due to a combination of the prism structure at the back of the light guide plate and the prism sheet used as the optical sheet, continue to occur. To solve the problems, the inventors of the present invention have found that the moire phenomenon can be suppressed by improving a front brightness distribution if the ridge direction of the prism patterns formed on the back of the emitting surface or the microprism patterns formed on the back unit cells is disposed in a predetermined alternate angle to the incident direction of light in the light guide plate and thus have completed the present invention.

PRIOR ART DOCUMENT

Patent Document

Patent Document 1: Japanese Patent Laid-Open Publication No. H6-118247
Patent Document 2: Korean Patent Registration No. 580890

SUMMARY OF THE INVENTION

Accordingly, the present invention has been made in view of the above problems occurring in the prior art, and it is an object of the present invention to provide a light guide plate for a surface light source device, having high front brightness, excellent uniformity in brightness, and controlled moire phenomenon.

It is another object of the present invention to provide a backlight unit using the light guide plate for a surface light source device.

To achieve the above objects, a light guide plate for a surface light source device according to an aspect of the present invention includes an incident surface configured to have light from lamps disposed along a predetermined axis, be incident thereon, an emitting surface configured to have the incident light emitted therefrom, a back surface configured to face the emitting surface, and a plurality of unit cells configured to have microprism patterns engraved thereon and distributed and arranged on the back surface. A crossing angle between a microprism arrangement axis formed by a ridge direction of the microprism patterns on the unit cells and a lamp arrangement axis formed by the lamps, is disposed in an alternate angle.

It is preferred that the crossing angle is 0.1 to 10°.

It is preferred that the microprism patterns have a unit prism angle of 40 to 120°, and a prism pitch of 1 to 100 µm.

It is preferred that the unit cell has a diameter of 1 to 2,000 µm.

The light guide plate for a surface light source device according to another aspect of the present invention includes an incident surface configured to have light from lamps, disposed along a predetermined axis, be incident thereon, an emitting surface configured to have the incident light emitted therefrom, a back surface configured to face the emitting surface, and a plurality of unit cells configured to have microprism patterns engraved thereon and distributed and arranged on the back surface, wherein a crossing angle between a microprism arrangement axis formed by a ridge direction of the microprism patterns on the unit cells and a lamp arrangement axis formed by the lamps is disposed in an alternate angle, and lenticular patterns are formed on the emitting surface.

It is preferred that the ridge direction of the lenticular patterns be parallel to the direction where the light is incident.

It is preferred that the lenticular patterns have a pitch of 10 to 300 µm.

A backlight unit having a wide viewing angle according to yet another aspect of the present invention includes the light guide plate; lamps provided on one side of an incident surface of the light guide plate; and at least one protection film stacked on an emitting surface of the light guide plate and configured to have light diffusing function.

BRIEF DESCRIPTION OF THE DRAWINGS

Further objects and advantages of the invention can be more fully understood from the following detailed description taken in conjunction with the accompanying drawings in which.

Figure 1:
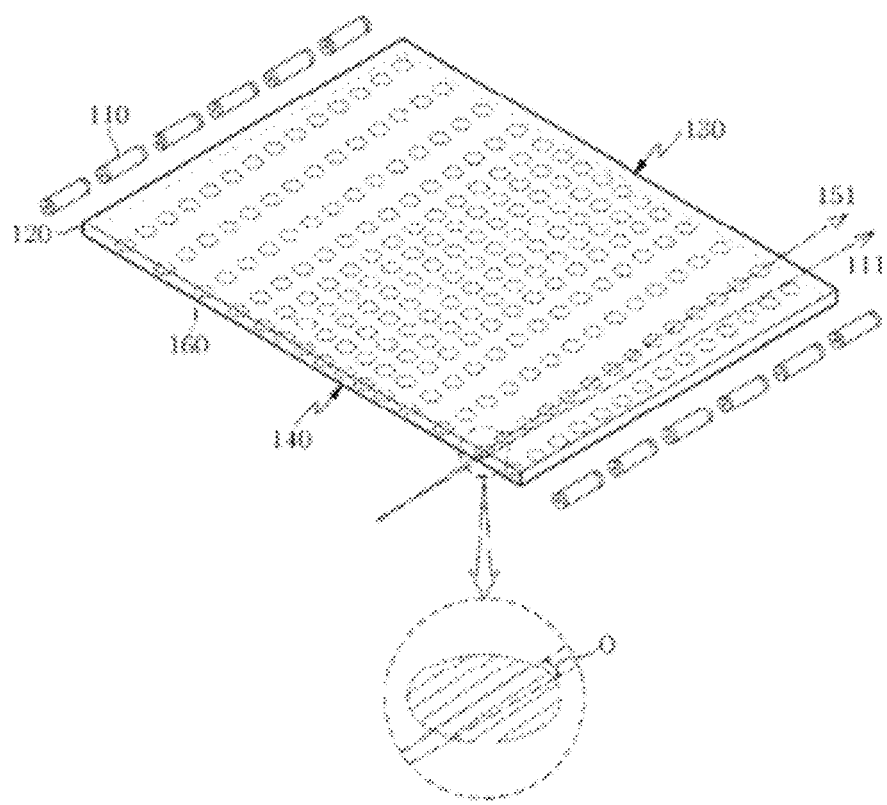
FIG. 1 is a perspective view of a light guide plate for a surface light source device according to an embodiment of the present invention.

DESCRIPTION OF REFERENCE NUMERALS OF PRINCIPAL ELEMENTS IN THE DRAWINGS 100, 200: light guide plate
110: lamp
111: lamp arrangement axis
120: incident surface
130: emitting surface
140: back surface
150: microprism pattern
151: microprism arrangement axis
160: unit cell
270: patterns on emitting surface

DETAILED DESCRIPTION OF EMBODIMENTS

Light guide plates for surface light source devices according to some exemplary embodiments of the present invention will now be described in detail with reference to the accompanying drawings.

FIG. 1 is a perspective view of a light guide plate 100 for a surface light source device according to an embodiment of the present invention. The light guide plate 100 for a surface light source device according to the present invention includes an incident surface 120 configured to have light from lamps 110, arranged according to a predetermined axis, be incident thereon; an emitting surface 130 configured to have the incident light emitted therefrom; and a back surface 140 configured to face the emitting surface. Here, a plurality of unit cells 160 having microprism patterns 150 engraved thereon is distributed and arranged on the back surface 140. Furthermore, a crossing angle θ between a microprism arrangement axis 151 formed by a ridge direction of the microprism patterns on the unit cells and a lamp arrangement axis 111 formed by the lamps, is disposed in an alternate angle.

In FIG. 1, the light guide plate 100 has a function to change the path of light, starting from the lamps 110 and then being incident on the inside of the light guide plate 100 via the incident surface 120, in the direction of the emitting surface 130 through operations, such as reflection, refraction, and diffraction. Polymer materials, having a high transmittance to visible rays, high strength, and less deformation and breaking, are used as the light guide plate 100. The polymer materials used for the light guide plate 100 may include acrylic resin, polycarbonate, cyclic olefin copolymers, and so on, preferably, arylic resin, and more preferably, polymethylmethacrylate.

The lamps 110 serve as light sources. The lamps 110 may be not only line source light, but also point source light which is made by liner arrangement of plural lamps. Light-Emitting Diodes (LEDs) or Cold Cathode Fluorescent Lamps (CCFLs) are chiefly used as the lamps 110.

The plurality of unit cells 160 having the microprism patterns 150 engraved thereon is distributed and arranged on the back surface 140 of the light guide plate 100.

Figure 2:
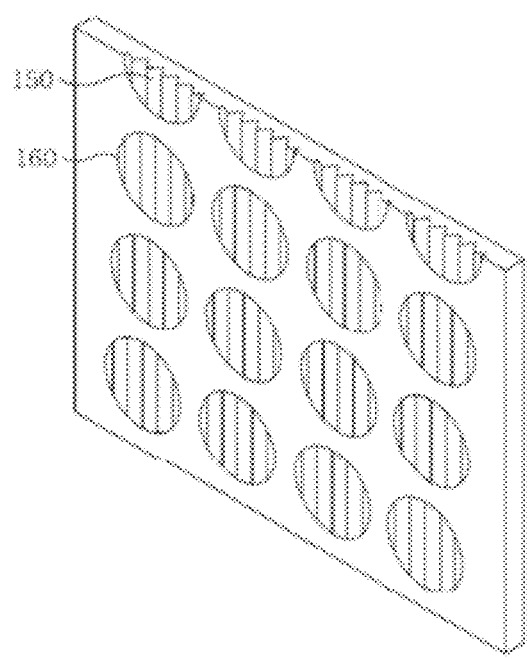
FIG. 2 is a partial enlarged view of the back 140 of the light guide plate for a surface light source device according to the embodiment of the present invention.

FIG. 2 is a partial enlarged view showing only the several unit cells 160, having the prism patterns 150 engraved thereon, which are formed on the back surface 140. The unit cells 160 on the back surface 140 illustrated in FIG. 2 are engraved with depressed engraving, but, not necessarily limited thereto. For example, the unit cells 160 on the back surface 140 may be engraved with embossed engraving. Furthermore, a bottom of the microprism patterns 150 on the unit cells 160 may be the same face as the back 140. In this case, the shapes of the unit cells 160 are defined by the shapes of the microprism patterns 150.

Figure 3A:
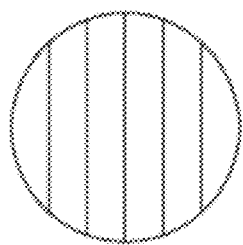
FIGS. 3A to 3D are illustrative figures showing the shapes of a unit cell 160 formed on the back 140 of the light guide plate for a surface light source device according to the embodiment of the present invention.
Figure 3B:
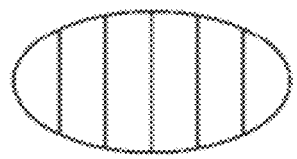
Figure 3C:
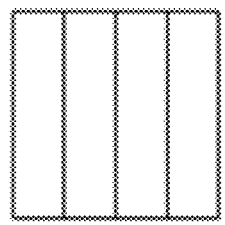
Figure 3D:
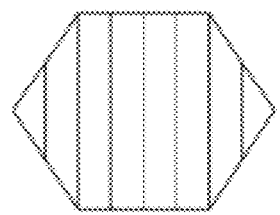

FIGS. 3A to 3D are explanatory figures showing the shapes of the unit cells 160. That is, the unit cell 160 may be circular (FIG. 3A), oval (FIG. 3B), square (FIG. 3C), or hexagonal (FIG. 3D). Furthermore, the shapes of the unit cells 160 are not necessarily limited to the illustrated shapes, but may have any shape, for example, a rectangle, a lozenge, or a combination of them. It is preferred that the unit cell 160 have 1 to 2,000 µm in diameter when the shape of the unit cell 160 is circular and have the greatest diameter of 1 to 2,000 µm in other cases. If the diameter of the unit cell 160 is less than 1 µm, a light reflection effect is insufficient. If the diameter of the unit cell 160 exceeds 2,000 µm, it is impossible to obtain uniformity of brightness between the LED lamps. When the light source is point source light, the uniformity of brightness could be obtained by controlling a distribution of the unit cells 160. If a unit cell has the diameter greater than 2,000 µm, there is limit to control of a distribution, which makes it difficult to raise the density of the unit cells per unit area to a predetermined level or higher.

Meanwhile, if the shape of a unit cell is an oval, the long axis or the short axis or both of the unit cell have only to belong to the above range, and if the shape of a unit cell is a polygonal, the length of one side of the unit cell has only to belong to the above range.

A distribution of the unit cells 160 formed on the back surface 140 may be controlled by adjusting the density of the unit cells 160 having the same diameter. In other words, the distribution of the unit cells 160 may have a gradient of number density, in a way that the number density of unit cells has minimum value at the incident surface and, has increasing value as the distance from the incident face become greater. Alternatively, the distribution of the unit cells may be controlled by adjusting the size of the unit cells 160. In other words, the distribution of the unit cells 160 may have a gradient of size of the unit cells, in a way that the size of unit cells 160 has minimum value at the incident surface and, has increasing value as the distance from the incident face become greater.

The microprism patterns 150 are formed in the unit cells 160. The microprism switches the pathway of incident light to the emitting surface, and increases brightness. It is preferred that the microprism pattern 150 have a unit prism angle of 40 to 120° and a unit prism pitch of 1 to 100 μm. If the prism angle is less than 40° or greater than 120°, brightness is degraded owing to an increase of a side lobe. If the prism pitch is less than 1 μm, there is no brightness increase effect because a light reflection effect is insufficient. If the prism pitch is greater than 100 μm, the total thickness of the backlight unit is increased because the total thickness of the light guide plate is increased.

The ridgelines of the unit prisms forming the microprism patterns 150 are parallel to each other. Meanwhile, a crossing angle θ between a microprism arrangement axis 151 formed by a ridge direction of the microprism patterns on the unit cells and a lamp arrangement axis 111 formed by the lamps, must be an alternate angle. In the present invention, the term 'alternate angle' refers to that the crossing angle θ is not 0° (that is, the microprism arrangement axis 151 and the lamp arrangement axis 111 of the lamps 110 are not parallel to each other). It is preferred that the crossing angle θ is 0.1 to 10°. If the crossing angle θ is less than 0.1°, the uniformity of brightness cannot be expected. If the crossing angle θ exceeds 10°, the uniformity of brightness may be obtained, but brightness itself is reduced. LED light, having the crossing angle θ of the above range and thus having excellent straightness, generates reflection having a gradient of the strength due to a prism structure, thus gradually reducing a variance of brightness for a shadow region through which the LED light does not pass. Accordingly, the light guide plate can have improved brightness uniformity.

Figure 4A:
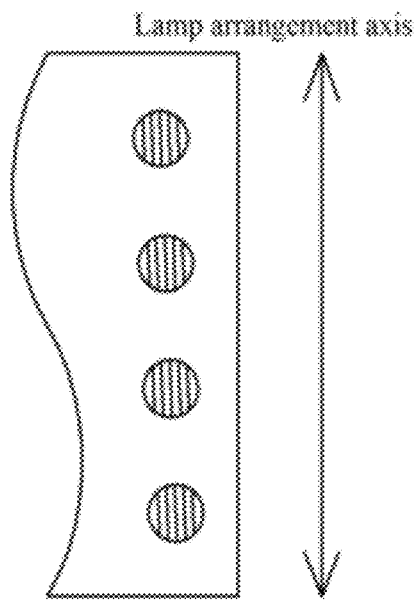
FIGS. 4A and 4B are illustrative figures showing the directions where the unit cells having microprism lens formed thereon are arranged.
Figure 4B:
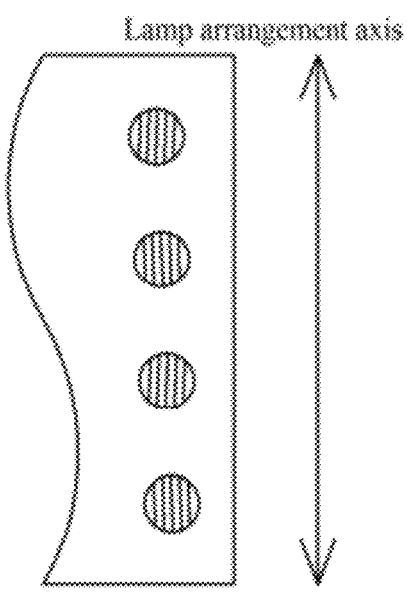

FIG. 4 is an illustrative figure showing the direction where the unit cells are arranged. In the present invention, the unit cells 160, as shown in FIG. 4A, may be arranged so that the microprism lens 150 formed in the unit cells 160 have the same ridge direction between all the unit cells 160. In an alternative embodiment, as shown in FIG. 4B, one group of the unit cells 160 and the other group of the unit cells 160 may be arranged so that they have different ridgeline directions. In this case, the orientation of the ridgelines may have a zigzag form between the unit cells. In some embodiments, although not shown, the ridgelines of the prism lenses may be arranged in zigzags within one unit cell.

Figure 5:
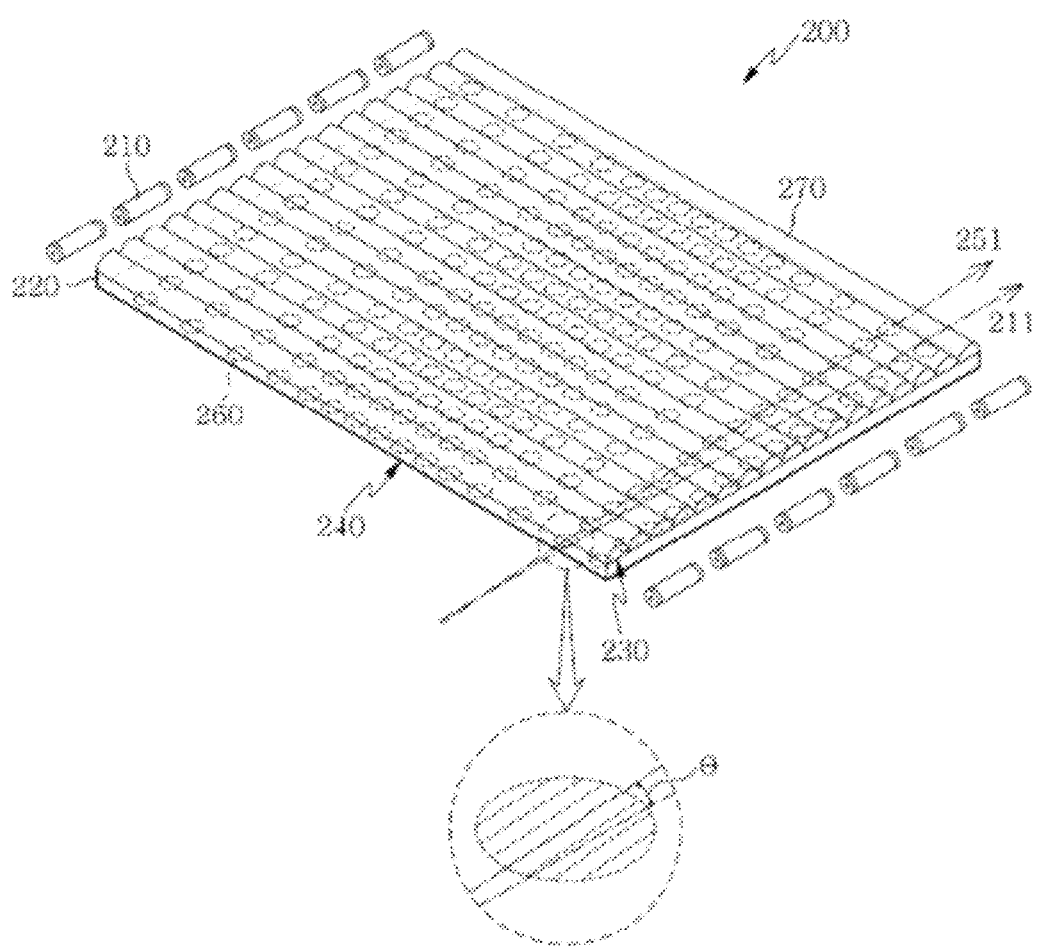
FIG. 5 is a perspective view of a light guide plate for a surface light source device according to another embodiment of the present invention.
Figure 6A:
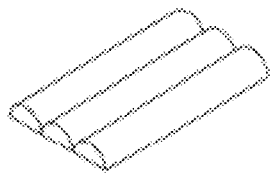
FIG. 6A to 6D are illustrative figure of patterns which may be formed in the emitting surface of the light guide plate for a surface light source device according to another embodiment of the present invention.
Figure 6B:
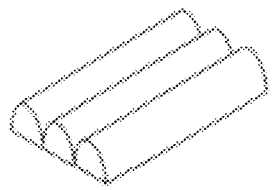
Figure 6C:
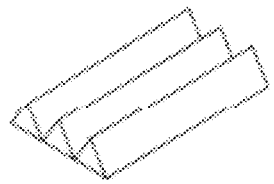
Figure 6D:
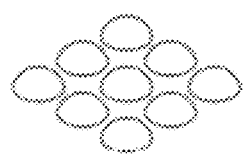

FIG. 5 is a perspective view of a light guide plate 200 for a surface light source device according to a second embodiment of the present invention. In FIG. 5, lenticular patterns 270 are formed in the emitting surface of the light guide plate 200 for a surface light source device according to another embodiment of the present invention. The patterns 270 formed in the emitting surface are configured to control the path of light, emitted from the inside of the light guide plate 200, at the outermost surface. The patterns 270 are second means for controlling the contrast of a bright-line portion and a dark-line portion. That is, an image of the bright-line portion is split by the image-separation function of the surface lenticular patterns 270, and thus the region of the dark-line portion is gradually reduced. The emitting angle of light reflected from the back surface 240 is controlled by the patterns 270, so that a better light distribution with excellent visibility and vertical brightness becomes possible.

FIG. 6 shows examples of possible patterns other than the lenticular patterns as patterns which may be formed in the emitting surface in the second embodiment of the present invention. The patterns formed in the emitting surface in FIG. 5 may semicircular lenticular patterns (FIG. 6A) of which cross-section is half circle. In addition, a parabola lens (FIG. 6B) in which oblique sides have respective curvatures on the basis of a vertical line passing through the peak, round prism type lens patterns (FIG. 6C) in which the vertical angle of a prism has a curvature, and independent hemispherical lens arrays (FIG. 6D) may be formed in the emitting surface of the light guide plate 200 according to the second embodiment of the present invention.

In the second embodiment of the present invention, in the case where the patterns 270 formed in the emitting surface have the lenticular patterns or the round prism type lens patterns, the direction formed by the ridgelines of the patterns must be parallel to light incident from the lamps 210 (or vertical to the direction where the lamps are arranged).

It is preferred that the patterns 270 have a pitch of 10 to 300 μm. If the pitch is less than 10 μm, a brightness improvement is reduced because specific area of the lenticular patterns having a lens function is reduced. If the pitch is more than 300 μm, there is a disadvantage in that the picture quality is degraded owing to the generation of a moiré phenomenon caused by interference between a liquid crystal and the lenticular patterns. Meanwhile, in the second embodiment of the present invention, other elements (e.g., the unit cells on the back surface, prism patterns formed in the unit cells, and the crossing angle) than the patterns 270 of the emitting surface are the same as those described at the first embodiment of the present invention.

The light guide plate for a surface light source device according to the present invention is used as a backlight unit in which light sources are disposed on one side of the incident surface of the light guide plate and a protection film having a light diffusing function is stacked over the emitting surface of the light guide plate.

The light guide plate according to each of the embodiments of the present invention may be fabricated by injection molding. In the injection molding, the light guide plate is fabricated by injecting polymer materials into the mold, on which the negative engraving of the back surface and/or the emitting surface is engraved. As another fabrication method, the light guide plate is fabricated by patterning the base plate. A method of forming the patterns on the base plate may include a stamping method using pressure and heating, or an imprint method using UV resin.

Hereinafter, the present invention is described in more detail in connection with examples. The examples are intended to describe the present invention in more detail, and the scope of the present invention is not limited to the examples.

EXAMPLES

1. Fabrication of a Plate for a Light Guide Plate

A base plate having 3.5 mm in thickness, 20 cm in width, and 10 cm in length was fabricated by using PMMA as raw materials. The PMMA base plate was fabricated using an extruding method. A common single screw extruder was used as an extruder.

Lenticular patterns 270 were formed on the top surface of the base plate, and the lenticular patterns 270 had a pitch of 200 μm and a height of 40 μm.

2. Fabrication of a Mold for Patterning

A mold plate having the copper thickness of 30 μm was fabricated by plating cold worked tool steel alloy SKD-11 with copper. A prism on which the diameter of a unit cell is 200 μm, a unit prism angle is 90°, and a unit prism pitch on the unit cells is 50 μm was fabricated by processing the fabricated original mold plate using diamond bytes. A distribution of the unit cells was adjusted using a method of controlling the density of the unit cells having the same diameter by arranging the unit cells having the same diameter. In other words, the distribution was adjusted to have a gradient so that the density of the unit cells is reduced as the cells become closer to the side on which light is incident, and is increased as the cells become far from the side on which light is incident. In this experiment, the % area of the patterns per unit area on the side of the light sources was 10%, the % area of the patterns per unit area at the center was 70%, and the density of unit cells changes at an interval of 0.2 cm from the light source side to the center.

3. Molding of Cell Patterns and Fabrication of a Light Guide Plate

In order to mold the cell patterns at the bottom of the prepared plate, a prepared pattern mold was mounted on press molding equipment, and patterns were stamped to the light guide plate through press molding by using a molding temperature of 200° C., a press time of 1 minute, and a press pressure of 10 kg/m². Here, the crossing angles between a microprism arrangement axis formed by a ridge direction of the microprism patterns on the unit cells and a lamp arrangement axis formed by the lamps, were 0.5°, 2°, 5°, and 10°, respectively.

Comparative Example 1

1. Fabrication of a Plate

A base plate having 3.5 mm in thickness, 20 cm in width, and 10 cm in length was fabricated by using PMMA as raw materials. The PMMA base plate was fabricated using an extruding method. A common single screw extruder was used as an extruder. However, the lenticular patterns were not formed on the top surface of the plate.

2. Fabrication of a Mold for Patterns Processing

A mold for pattern processing was fabricated using the same method as that of the embodiment.

3. Molding of Unit Cells and Fabrication of a Light Guide Plate

The light guide plate was fabricated using the same method as that of examples except that the crossing angle between a microprism arrangement axis formed by a ridge direction of the microprism patterns on the unit cells and a lamp arrangement axis formed by the lamps, was 0° (that is, the microprism arrangement axis and the lamp arrangement axis were parallel to each other).

Comparative Example 2

A plate and a mold for pattern processing were fabricated using the same method as that of the examples, and a light guide plate was fabricated using the same method as that of embodiment 1 except that the crossing angle, formed by the microprism arrangement axis of unit cells and the arrangement axis of lamps, was 0° (that is, the microprism arrangement axis and the lamp arrangement axis were parallel to each other).

Comparative Example 3

1. Fabrication of Plate

A base plate having 3.5 mm in thickness, 20 cm in width, and 10 cm in length was fabricated by using PMMA as raw materials. The PMMA base plate was fabricated using an extruding method. A common single screw extruder was used as an extruder. However, the lenticular patterns were not formed on the top surface of the plate.

2. Fabrication of a Mold for Patterns Processing

A mold for pattern processing was fabricated using the same method as that of the examples.

3. Molding of Cell Patterns and Fabrication of a Light Guide Plate

In order to mold the cell patterns at the bottom of the prepared plate, a prepared pattern mold was mounted on press molding equipment, and patterns were formed in the light guide plate through press molding by using a molding temperature of 200° C., a press time of 1 minute, and a press pressure of 10 kg/m². Here, the crossing angle between a microprism arrangement axis formed by a ridge direction of the microprism patterns on the unit cells and a lamp arrangement axis formed by the lamps, was 2°.

<Evaluation>
1. Brightness
Measurement equipment: BM-7 produced by TOPCON TECHNOHOUSE CORPORATION
Measurement method: The light guide plate was mounted on a backlight unit having 32-inch LED lamps mounted thereon, the 32-inch area was divided into nine equal parts, and brightness at the central portion of each of the nine equal parts was measured. Then, brightness of the light guide plate was calculated by arithmetically meaning the measurement values of the 9 points.

2. Uniformity of Brightness
Measurement equipment: BM-7 by TOPCON TECHNOHOUSE CORPORATION
Measurement method: The light guide plate was mounted on a backlight unit having 32-inch LED lamps mounted thereon, the 32-inch area was divided into thirty equal parts, and brightness at the central portion of each of the thirty equal parts was measured. Uniformity of brightness was obtained by calculating a ratio of a minimum value to a maximum value in the each measured brightness.

3. Moire Check

The light guide plate was mounted on the backlight unit, and the prism sheet having a valley direction parallel to the direction of the lamps was mounted on the backlight unit. Whether a moire phenomenon has occurred was observed by the naked eye by turning on the lamps.

Evaluation results of the above embodiments and comparative examples are summarized in Table 1 below.

TABLE 1

| | Angle (°) | Lenticular Pattern | Brightness cd/m$^2$ | Uniformity (%) | Moire |
|---|---|---|---|---|---|
| Example 1 | 0.5 | Yes | 3150 | 65 | No |
| Example 2 | 2 | Yes | 3135 | 67 | No |
| Example 3 | 5 | Yes | 3140 | 70 | No |
| Example 4 | 10 | Yes | 3150 | 72 | No |
| Comparative Example 1 | 0 | No | 3000 | 55 | Yes |
| Comparative Example 2 | 0 | Yes | 3140 | 58 | Yes |
| Comparative Example 3 | 2 | No | 3000 | 60 | No |

From Table 1, it can be seen that the light guide plates of the example 1 to the example 4 whose crossing angles are 0.5°, 2°, 5°, and 10°, respectively, have a similar brightness value, and have significantly improved uniformity of about 12% to 24%, as compared with the comparative example 2 having the crossing angle of 0°. Furthermore, as can be seen from the results of the example 1 to example 4 having the above crossing angles and the comparative example 1 and comparative example 2 having the crossing angle of 0°, when the crossing angle is an alternate angle, a moire phenomenon was not observed. The moire phenomenon is generated when two upper and lower prisms have the same frequency. From the above results, it could be seen that the moire phenomenon could be controlled by the present invention in which the upper prism (of prism sheet) and lower prisms (of light guide plate) are disposed in alternate angles.

Figure 7A:
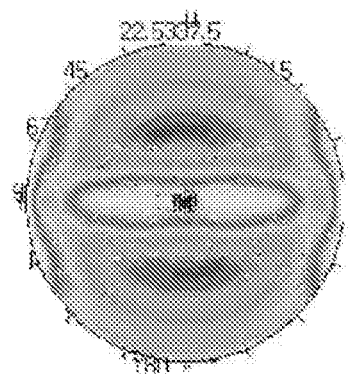
FIGS. 7A to 7C show simulation results of light-emitting angles according to a change of the crossing angle.
Figure 7B:
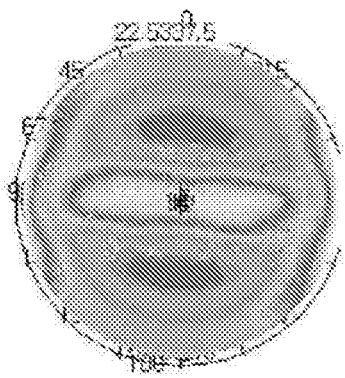
Figure 7C:
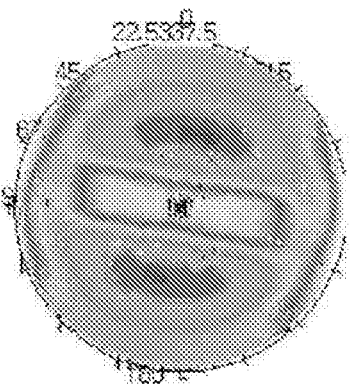

The above results can also be supported by simulation results of FIG. 7. FIGS. 7A, 7B, and 7C show the simulation results regarding a change of light-emitting angles according to a change of the crossing angles in the comparative example 2, the example 3, and the example 4. The simulations were performed using a simulation apparatus called "Light Tool" which is typically used in the industry. Referring to FIGS. 7A, 7B, and 7C, in the case of the comparative example 2, when the crossing angle is 0°, an emitting viewing angle is also 0°. Accordingly, if a prism was mounted, a moire phenomenon was generated because the regularity of a prism of the light guide plate is matched with the regularity of an upper prism. However, in the case of the example 3 and the example 4, the crossing angles were 5° and 10°, and thus the emitting angles of 5° and 10° were confirmed from the simulations. It could be explained as although the prism was mounted on the upper side of the back light unit of the examples, a moire phenomenon was not generated owing to pattern irregularity with the prism patterns of the light guide plate. It means that an optical path can be controlled through the angle of the arrangement axis. Moreover, in the example 2, it can be seen that both brightness and uniformity were improved as compared with the comparative example 3 not having lenticular patterns on a surface. From these results, it can also be confirmed that brightness was improved through the lenticular patterns.

As described above, the light guide plate for a surface light source device according to the present invention has a high front brightness, an excellent uniformity in brightness, a wide viewing angle. Furthermore, a moire phenomenon is not generated. If the light guide plate of the present invention is used in a backlight unit, the use of optical sheets stacked on the light guide plate can be reduced. Accordingly, a liquid crystal display device module can be made slim, the manufacturing process can be simplified, and the manufacturing cost can be reduced.

The light guide plate for a surface light source device and the backlight unit including the same according to the present invention may be widely used to control the emission of light in devices using LED lamps, such as LCDs and illumination devices.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A light guide plate for a surface light source device, comprising:
    an incident surface configured to have light from lamps disposed along a predetermined axis, be incident thereon;
    an emitting surface configured to have the incident light emitted therefrom;
    a back surface configured to face the emitting surface; and
    a plurality of unit cells configured to have microprism patterns engraved thereon and distributed and arranged on the back surface,
    wherein a crossing angle between a microprism arrangement axis formed by a ridge direction of the microprism patterns on the unit cells and a lamp arrangement axis formed by the lamps is an acute angle,
    wherein two or more unit cells are arranged along the microprism arrangement axis.

2. The light guide plate as claimed in claim 1, wherein the crossing angle between the microprism arrangement axis and the lamp arrangement axis, is from 0.1 to 10°.

3. The light guide plate as claimed in claim 1, wherein the microprism patterns of the unit cells have a prism angle of 40 to 120°, and a prism pitch of 1 to 100 μm.

4. The light guide plate as claimed in claim 1, wherein the unit cell has a diameter of 1 to 2,000 μm.

5. The light guide plate as claimed in claim 1, wherein lenticular patterns are formed on the emitting surface.

6. The light guide plate as claimed in claim 5, wherein the ridge direction of the lenticular patterns is parallel to a direction where the light is incident.

7. The light guide plate as claimed in claim 5, wherein the lenticular patterns have a pitch of 10 to 300 μm.

8. A backlight unit having a wide viewing angle, comprising:
    a light guide plate according to claim 1; lamps provided on one side of an incident surface of the light guide plate; and
    at least one protection film stacked on an emitting surface of the light guide plate and configured to have light diffusing function.

9. A backlight unit of claim 8, wherein the crossing angle between the microprism arrangement axis and the lamp arrangement axis, is from 0.1 to 10°.

10. A backlight unit of claim 8, wherein the microprism patterns of the unit cells have a prism angle of 40 to 120°, and a prism pitch of 1 to 100 μm.

11. A backlight unit of claim 8, wherein the unit cell has a diameter of 1 to 2,000 μm.

12. A backlight unit of claim 8, wherein lenticular patterns are formed on the emitting surface.

13. A backlight unit of claim 12, wherein the ridge direction of the lenticular patterns is parallel to a direction where the light is incident.

14. A backlight unit of claim 12, wherein the lenticular patterns have a pitch of 10 to 300 μm.

* * * * *